US008063112B2

(12) United States Patent
Campbell et al.

(10) Patent No.: US 8,063,112 B2
(45) Date of Patent: Nov. 22, 2011

(54) PROCESS FOR THE REGENERATION OF AN ION EXCHANGE RESIN USING SULFUROUS ACID

(75) Inventors: Matthew Campbell, Montreal (CA); John Sarlis, Laval (CA); Vijay Bhambhani Godhwani, Montreal (CA); Melina Infantino, Montreal (CA)

(73) Assignee: Cansolv Technologies Inc., Montreal, Quebec (CA)

( * ) Notice: Subject to any disclaimer, the term of this patent is extended or adjusted under 35 U.S.C. 154(b) by 285 days.

(21) Appl. No.: 12/329,938

(22) Filed: Dec. 8, 2008

(65) Prior Publication Data

US 2010/0144908 A1 Jun. 10, 2010

(51) Int. Cl.
*B01J 49/00* (2006.01)
(52) U.S. Cl. .......................................... 521/26
(58) Field of Classification Search .............. 521/26; 29/26
See application file for complete search history.

(56) References Cited

U.S. PATENT DOCUMENTS

| | | | |
|---|---|---|---|
| 3,540,860 A * | 11/1970 | Cochran | 252/79.2 |
| 4,113,849 A | 9/1978 | Atwood | |
| 4,122,149 A | 10/1978 | Dunnery et al. | |
| 4,336,102 A | 6/1982 | Jacobs et al. | |
| 4,970,344 A | 11/1990 | Keller | |
| 5,006,258 A * | 4/1991 | Veatch et al. | 210/677 |
| 5,019,361 A | 5/1991 | Hakka | |
| 5,045,291 A | 9/1991 | Keller | |
| 5,082,567 A | 1/1992 | Fritts et al. | |
| 5,292,407 A | 3/1994 | Roy et al. | |
| 5,368,818 A | 11/1994 | Cummings et al. | |
| 5,788,864 A | 8/1998 | Coberly et al. | |
| 6,245,128 B1 | 6/2001 | George, Jr. | |
| 6,334,886 B1 | 1/2002 | Barnes, Jr. et al. | |
| 7,214,358 B2 | 5/2007 | Ravary et al. | |
| 2007/0213415 A1 | 9/2007 | Sarlis | |

FOREIGN PATENT DOCUMENTS

| | | |
|---|---|---|
| EP | 0429183 A1 | 5/1991 |
| EP | 0430432 A2 | 6/1991 |
| EP | 0471592 A2 | 2/1992 |

OTHER PUBLICATIONS

International Search Report on the corresponding international application PCT/CA2009/001791, mailed on Mar. 23, 2010.
International Search Report and Written Opinion on the co-owned international application No. PCT/CA2009/001580, mailed on Jan. 22, 2010.

* cited by examiner

*Primary Examiner* — Ling Choi
*Assistant Examiner* — Chun-Cheng Wang
(74) *Attorney, Agent, or Firm* — Philip C. Mendes da Costa; Bereskin & Parr LLP S.E.N.C.R.L., s.r.L.

(57) ABSTRACT

A diamine absorbent that contains heat stable salts is regenerated using an ion exchange process wherein the cation exchange resin is regenerated using sulfurous acid reflux.

21 Claims, 5 Drawing Sheets

Regeneration Patterns with $H_2SO_4$ 1 %wt and Reflux at pH 1.28
1.1 eq $SO_4$/mol Amine

|   | 0.5 | 1 | 1.5 | 2 |
|---|---|---|---|---|
| Sodium, $H_2SO_4$ | 464 | 1867 | 3298 | 3627 |
| Sodium, Reflux | 1712 | 5063 | 4058 | 2742 |
| Amine, $H_2SO_4$ | 16439 | 16038 | 6625 | 1870 |
| Amine, Reflux | 22305 | 7682 | 2130 | 1456 |

PROCESS FOR THE REGENERATION OF AN ION EXCHANGE RESIN USING SULFUROUS ACID

FIELD

In one aspect, the disclosure relates to a process for the regeneration of an ion exchange resin. In another aspect, the disclosure relates to a process for the regeneration of an acidic cation exchange resin.

BACKGROUND

The separation of acid gases such as sulfur dioxide ($SO_2$) or carbon dioxide ($CO_2$) from gas streams such as waste gas streams, e.g. flue gas or hydrocarbon containing streams by means of absorption into aqueous amine solvents is well known. Many of these processes, which are referred to as amine treater processes, are described in "Gas Purification", 5$^{th}$ Edition, Ed. Arthur L. Kohl and Richard B. Nielsen, Gulf Publishing Company, Houston, Tex.

Amine treater processes use a regenerable amine solvent whereby the acid gas is captured into the solvent at one temperature and the acid gas is desorbed or stripped from the solvent, generally at a higher temperature.

The amine solvent for removing a given acid gas component from a feed stream may be chosen so that the acid gas can be removed from the solvent by steam stripping. If steam stripping is utilized, then in order to separate the acid gas from the solvent, the acid gas must be volatile while in solution. Preferably, the acid ionization constant of the conjugate acid of the amine (the $pK_a$) has a value no more than about 3 or 4 units higher than the $pK_a$ of the acid gas. If this difference in $pK_a$ is larger than about 3 or 4 units, then the salt formed between the amine and the acid is too stable to be practically dissociated by steam stripping.

In commercial operation, acid gas capture processes experience ingress and/or in process generation of acids that are stronger than the acids for which the removal process is designed. These stronger acids form salts with the amine solvent which are not regenerable with steam and are thus termed heat stable amine salts (HSAS), or just heat stable salts (HSS).

If the heat stable salts are allowed to accumulate, they will eventually neutralize all the amine of the solvent, rendering it unable to react with and remove the acid gas component as intended. Accordingly, provision for heat stable salt removal is necessary for systems where strong acids accumulate in the amine solvent.

Various means for removal of heat stable salts from amine gas treating solutions are known. These include distillation of the free amine away from the salt at either atmospheric or subatmospheric pressure (see for example "Gas Purification", p. 255ff), electrodialysis (see for example U.S. Pat. No. 5,292,407) and ion exchange (see for example U.S. Pat. No. 4,122,149; U.S. Pat. No. 4,113,849; U.S. Pat. No. 4,970,344; U.S. Pat. No. 5,045,291; U.S. Pat. No. 5,292,407; U.S. Pat. No. 5,368,818; U.S. Pat. No. 5,788,864 and U.S. Pat. No. 6,245,128).

One problem with ion exchange processes is that the ion exchange medium or resin must be regenerated from time to time. During the loading stage of the ion exchange process, the anion removal capacity is used up as heat stable salts are removed from the amine solvent. Upon exhaustion or reduction of the anion removal capacity of the ion exchange resin by a particular amount, feed of the heat stable salt rich amine solvent to the ion exchange resin is terminated so that the ion exchange resin may be regenerated.

SUMMARY

In accordance with one aspect of the present disclosure, a process for the regeneration of an acidic cation exchange resin used to treat an acid gas absorbent stream comprising at least one alkali metal salt is disclosed. The acid gas absorbent is preferably obtained from an acid gas recovery unit. In another aspect, the disclosure relates to a process for the regeneration of an acidic cation exchange resin using sulfurous acid. In accordance with this process, an acidic cation exchange resin may be regenerated using a sulfurous acid reflux which reduces the loss of acid gas absorbent and/or reduces the dilution of the acid gas absorbent that is recovered during the regeneration process and returned to the acid gas recovery unit. In particular, it has been determined that regenerating an acidic cation exchange resin using a sulfurous acid reflux obtained from an acid gas recovery unit, results in lower acid gas absorbent loss. The use of a sulfurous acid reflux, as opposed to sulfuric acid solution, does not add sulfate ions to the diamine absorbent, which form heat stable salts.

In operation, an acid gas absorbent stream may be obtained from an acid gas recovery unit. The acid gas recovery unit preferably includes an absorption unit and a regeneration unit, which are preferably operated cyclically. Accordingly, the absorbent is loaded with acid gas in the absorption unit and at least some of the acid gas is removed from the absorbent in the regeneration unit. Accordingly, the absorbent is continually cycled through the process. From time to time, fresh absorbent may be added to replace absorbent that is lost during operation of the process.

In the absorption unit, a feed gas (e.g., a waste gas) containing sulfur dioxide ($SO_2$) and optionally one or more of carbon dioxide ($CO_2$), nitrous oxides ($NO_x$) and combinations of one or more of these gasses, is contacted with an absorbent, such as by passing the feed gas through an absorption column. As the feed gas passes through the column, at least some of the sulfur dioxide and optionally, other acid gases such as carbon dioxide and/or nitrous oxides, are absorbed by a diamine absorbent producing a diamine absorbent stream, which may also be referred to as a spent absorbent stream.

In the regeneration unit, the spent absorbent stream is treated to remove at least some of the sulfur dioxide and, optionally, other acid gases such as carbon dioxide and/or nitrous oxides that have been absorbed by the absorbent. The absorbent is preferably regenerated using steam, such as by passing the spent absorbent stream through a steam stripper, wherein through the use of steam, the acid gas dissociates from the amine solvent.

Inevitably acids, which are stronger than that which can be dissociated from the absorbent using heat, enter the acid gas recovery unit. Such acids remain in the absorbent in the form of the heat stable amine salts.

At least some of the diamine absorbent stream comprising at least one heat stable salt, e.g., a bleed stream, is withdrawn from the acid gas recovery unit, preferably subsequent to the regeneration of the absorbent but prior to the reuse of the absorbent in the absorption step, and is then directed to the ion exchange unit. The ion exchange unit preferably comprises an anion exchange unit (preferably comprising one or more anion exchange beds) wherein anions of the heat stable salts such as one or more of, for example, sulfates, thiosulfates, sulfites, chlorides, nitrates and organic acids, are removed followed by a cation exchange unit (preferably comprising one or more cation exchange beds) wherein cations from the heat stable salts, such as one or more of sodium, potassium and lithium are removed. The anion and cation exchange units are each preferably operated according to the following sequence.

1. Contact the absorbent with the ion exchange medium to remove anions or cations of the heat stable salts from the absorbent.
2. Provide clean wash water to the ion exchange medium to remove absorbent from the medium and optionally recycle at least a portion of the used wash water to the acid gas recovery unit (the pre-resin regeneration wash step).
3. Contact the ion exchange medium with a regeneration agent to regenerate the ion exchange medium.
4. Provide wash water to the ion exchange medium to remove regeneration agent from the medium.

During the pre-resin regeneration wash step, amine absorbent is flushed from the resin bed. If the concentration of amine is sufficiently high (e.g., 500 ppm or more), then the wash water may be recycled to the acid gas capture unit to prevent the loss of the absorbent. If the concentration of amine is lower, then the addition of the wash water to the absorbent circulating in the acid gas capture unit may overly dilute the absorbent. Accordingly, at least a portion of the amine absorbent that is flushed from the resin bed during the pre-resin regeneration wash step will be lost.

It has surprisingly been determined that when the regeneration agent for the acidic cation exchange resin is sulfurous acid, the sulfurous acid selectively displaces the diamine absorbent over the alkali metal cations from the exchange resin, resulting in a spent regeneration stream (e.g., the first portion of the spent regeneration stream) that is rich in the diamine absorbent and may be recycled back to the acid gas recovery unit.

Accordingly, the present disclosure includes a process for the regeneration of an acidic cation exchange resin used to treat an acid gas absorbent stream comprising at least one alkali metal salt, the process comprising:

(a) obtaining the acid gas absorbent stream from an acid gas recovery unit;
(b) contacting the acid gas absorbent stream with an acidic cation exchange resin and generating a cation reduced acid gas absorbent stream; and,
(c) regenerating the acidic cation exchange resin using a sulfurous acid reflux obtained from the acid gas recovery unit and producing a spent regeneration stream.

In any embodiment of the disclosure, the sulfurous acid reflux is obtained from a steam stripping unit of the acid gas recovery unit.

In any embodiment, a feed gas to the acid gas recovery unit includes $SO_2$ and the sulfurous acid is generated from the $SO_2$ captured by an acid gas absorbent stream from the feed gas in the acid gas recovery unit. In any embodiment, the sulfurous acid reflux may have a concentration of sulfurous acid of from about 1 to about 5 wt %, and preferably about 3%

In any embodiment, the alkali metal salt may be an alkali metal salt of at least one strong acid. A strong acid is an acid that ionizes almost completely in an aqueous solution. Preferably, the strong acid comprises at least one of sulfuric acid, nitric acid or hydrochloric acid. In any embodiment, the alkali metal may comprise sodium and/or potassium.

In any embodiment, the acidic cation exchange resin may be a strong acid resin.

In any embodiment, the process may further comprise recycling the cation reduced acid gas absorbent stream to the acid gas recovery unit.

In any embodiment of the disclosure, the acid gas recovery unit may include an absorption unit including an absorber and an absorbent regeneration unit that includes a steam stripping column and the process may further comprise obtaining the acid gas absorbent stream from downstream of the steam stripping column and upstream of the absorber.

In any embodiment, the spent regeneration stream may comprise a first portion and a second portion and the process further comprises recycling only the first portion of the spent regeneration stream to the acid gas recovery unit for use as part of an acid gas absorption stream.

In any embodiment, the acid gas absorption stream may comprise a diamine absorbent and the first portion of the spent regeneration stream has a diamine concentration of 1000 ppm to 30,000 ppm.

In any embodiment, the second portion of the spent regeneration stream may comprise alkali metal salts having a concentration of 250 ppm to 7000 ppm and the second portion is directed to waste treatment.

In any embodiment, the process may further comprise rinsing the acidic cation exchange resin with water and generating an absorbent rich rinse stream prior to contacting the acidic cation exchange resin with the acid gas absorbent stream. Preferably, the absorbent rich rinse stream is recycled back to the acid gas recovery unit for use as part of an acid gas absorbent stream.

In any embodiment of the disclosure, the process may further comprise utilizing a sufficient amount of sulfurous acid reflux to regenerate the acidic cation exchange resin that the acidic cation exchange resin is ready for use to treat an additional amount of the acid gas absorbent stream in the absence of a final water rinse.

In any embodiment, the process may further comprise utilizing the acidic cation exchange resin to treat an additional amount of the acid gas absorbent stream as the next process step subsequent to step (c) of the process.

In any embodiment, the acid gas absorbent stream may comprise a diamine absorbent having a concentration of heat stable salts that is less than 1 equivalent/mole of diamine, preferably, the concentration is less than 0.7 equivalent/mole of diamine.

In any embodiment, the process may further comprise contacting the acid gas absorbent stream with a basic anion exchange resin in the hydroxide form and generating an anion lean acid gas absorbent stream and using at least a portion of the anion lean acid gas absorbent stream in step (b) of the process. Preferably, the portion of the anion lean acid gas absorbent stream used in step (b) of claim 1 has a concentration of heat stable salts that is less than 1 equivalent/mole of diamine.

BRIEF DESCRIPTION OF THE DRAWINGS

These and other advantages of the instant invention will be more fully and completely understood in accordance with the following description of the preferred embodiments of the invention in which.

DETAILED DESCRIPTION OF THE INVENTION

While in one aspect the disclosure is directed to a process for regenerating an acidic cation exchange resin, the disclosure will be exemplified in combination with an acid gas recovery unit used to recover acid gases from a feed gas.

Figure 1:
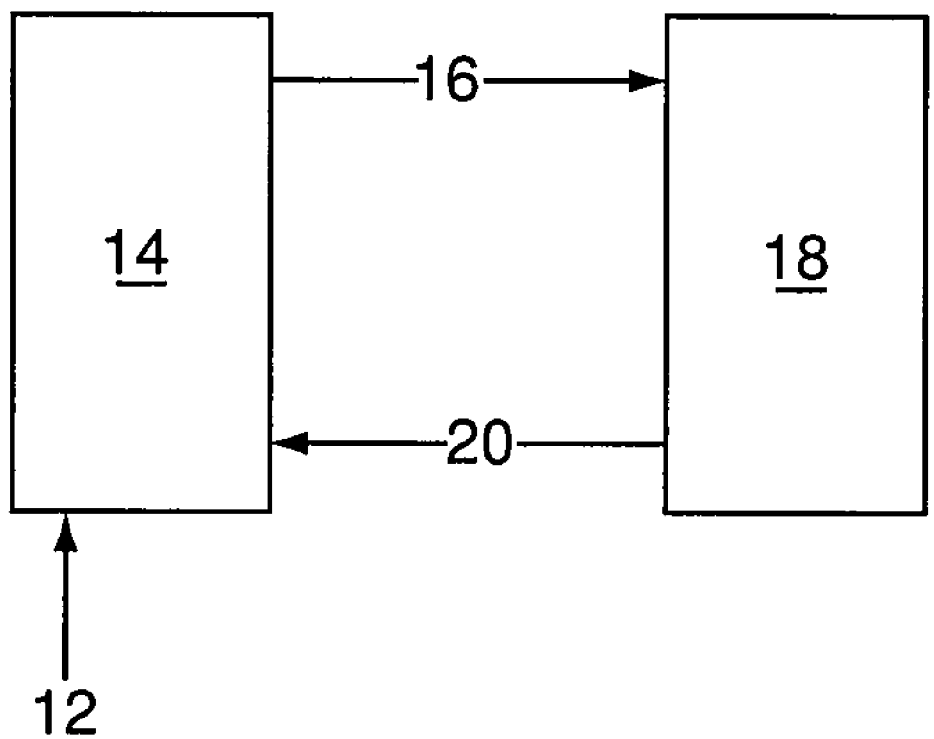
FIG. 1 is a simplified process flow diagram of an acid recovery unit, showing a stream connecting it to an acidic cation exchange process according to an embodiment of this disclosure.

As exemplified in the simplified flow diagram of FIG. 1, an acid gas recovery unit 14 is integrated with an acidic cation exchange resin 18 so as to remove heat stable salts from an acid gas absorbent. The cation exchange resin removes cations of heat stable salts from a diamine absorbent. An acid gas absorbent stream 16 comprising heat stable salts is transferred from the acid gas recovery unit 14 to the acidic cation exchange resin 18. The acid gas absorbent stream 16 is contacted with the acidic cation exchange resin 18 to produce a cation reduced acid gas absorbent stream 20 which is recycled back to the acid gas recovery unit 14 to be used again as an absorbent for acid gases. It will be understood by those in the art that an acidic cation exchange resin can become fully saturated resulting in a used or spent acidic cation exchange resin, requiring the regeneration of the resin.

Figure 2:
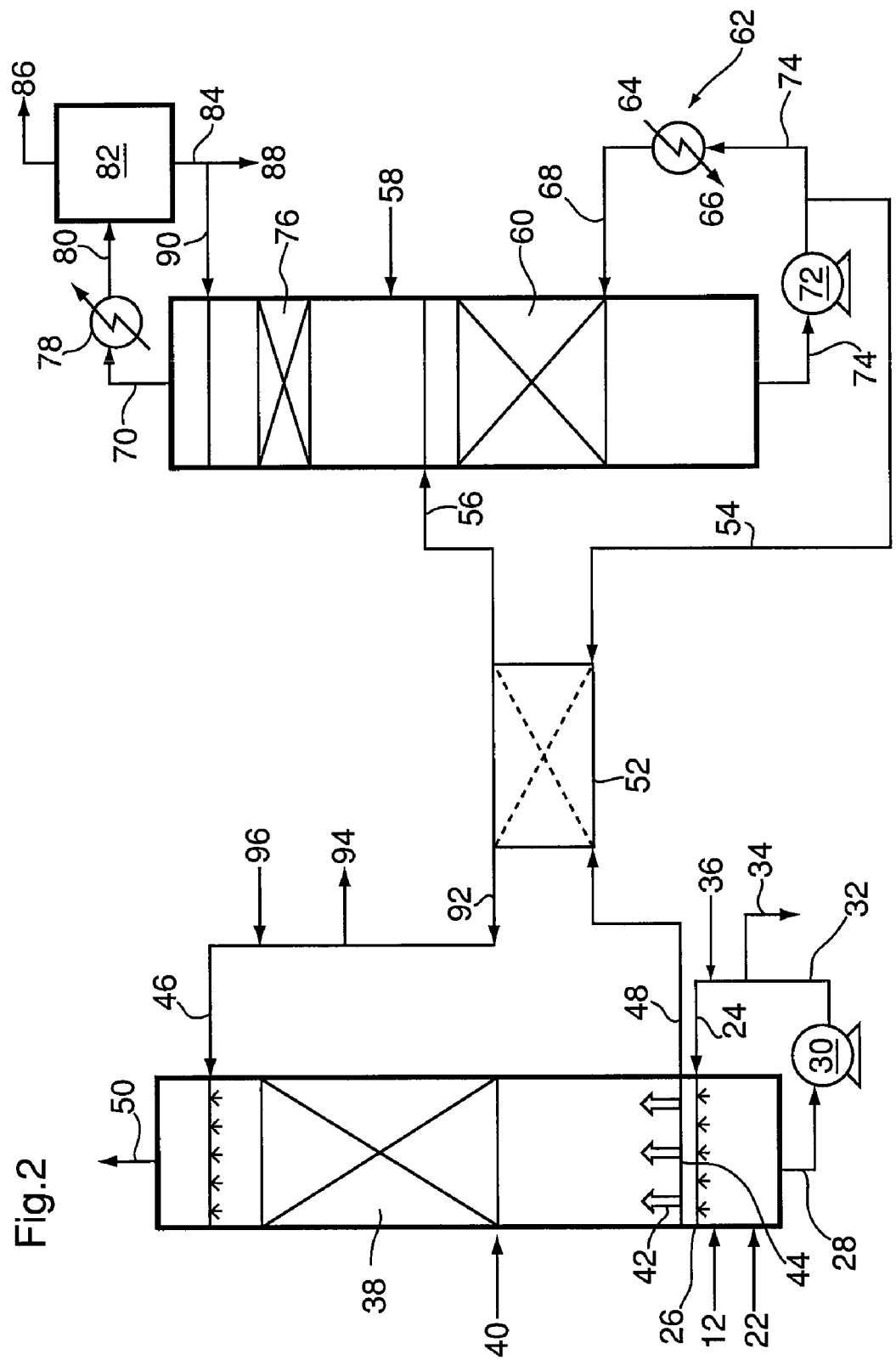
FIG. 2 is a flow diagram of the acid recovery unit, including a steam stripping process, according to an embodiment of this disclosure.

It will be appreciated that any particular design known in the art may be used for the acid recovery unit and that the embodiments shown in FIGS. 1 and 2 are exemplary. For example a feed gas may contain only one target gas (e.g. sulfur dioxide) or a plurality of target gases (e.g. sulfur dioxide and carbon dioxide). If a plurality of gases are targeted for removal from the feed gas, then the acid recovery unit may have a plurality of absorption zones, each of which utilizes a different solvent stream thereby producing a plurality of solvent streams which may be individually regenerated. For example, a first solvent loop may be provided for removing sulfur dioxide from an acid gas using a first solvent and regenerating the first solvent. A second solvent loop may be provided for removing carbon dioxide from the acid gas using a second solvent, subsequent to the removal of the sulfur dioxide, and regenerating the second solvent. A first acidic cation exchange resin unit may be utilized to remove heat stable salts from the first amine absorbent and a second acidic cation exchange resin unit may be utilized to remove heat stable salts from the second amine absorbent. It will also be appreciated that each acidic cation exchange unit may comprise one or a plurality of acidic cation exchange reactors or columns and may utilize feed tanks and reservoir tanks as is known in the art, such as for use in ensuring a continuous feed to an acidic cation exchange column and reducing surges through the process.

It will be appreciated that the feed gas stream may contain only one or a plurality of acid gasses, e.g., $SO_2$ and optionally one or more of $H_2S$, $CO_2$ and $NO_x$, and that feed gas stream may be sequentially treated in different stages to reduce the concentration of each acid gas to below a predetermined level. Accordingly, a feed gas stream may be contacted with a first amine solvent to reduce the concentration of a first acid gas, e.g., $SO_2$, to below a predetermined level. The feed gas stream may then be contacted with second amine solvent to selectively capture a second acid gas, e.g. $CO_2$ from the feed gas stream. Alternately, two or more gasses may be removed in one treatment stage. Accordingly, one solvent may be used to capture two or more gasses from the feed gas stream.

Heat stable salts may build up in each solvent. Therefore, at least a portion of each solvent may be separately fed to an acidic cation exchange unit to remove heat stable salts from the solvent. Thus, the first solvent may be fed to a first acidic cation exchange column and the second solvent may be fed to a second acidic cation exchange column. In this way, each solvent may be circulated in a separate loop to prevent mixing of the different solvent streams. Alternately, each solvent may be separately treated in a single acidic cation exchange unit.

The feed gas provided to the acid gas recovery unit may be any gas stream that contains sulfur dioxide, and optionally at least one more acid gas. Preferably the feed gas stream contains at least sulfur dioxide, and optionally at least one of $CO_2$ and $H_2S$, and more preferably contains $SO_2$, and optionally, $CO_2$. The feed gas may be a process gas stream or a waste gas stream obtained from various sources. For example, the feed gas stream may be:

(a) Sour natural gas, comprising methane, other hydrocarbons, hydrogen sulfide, carbon dioxide and water, usually at elevated pressure of up to 100 bar and moderate temperature near ambient.

(b) Flue gas from the combustion of sulfur containing fossil fuel, comprising nitrogen, oxygen, carbon dioxide, sulfur dioxide, sulfur trioxide and water at substantially atmospheric pressure and elevated temperature of up to 200° C. or even higher.

(c) Sulfuric acid plant tail gas comprising nitrogen, oxygen, sulfur dioxide and sulfur trioxide at close to atmospheric pressure and moderately elevated temperature of less than 200° C.

When sulfur dioxide dissolves in and reacts with water, it produces sulfurous acid, $H_2SO_3$, which is a substantially stronger acid ($pK_{a1}$=1.8) than carbonic acid, $H_2CO_3$ ($pK_{a1}$=6.4), produced by the hydration of carbon dioxide or hydrogen sulfide ($pK_{a1}$=7.0). If it is desired to capture sulfur dioxide from a feed gas using a regenerable acid gas recovery process, then an appropriately weak amine having a $pK_a$ preferably less than 6 is preferably used. The weak amine is not able to capture any significant quantity of $CO_2$, which stays in the treated gas. Accordingly, such a weak amine may be used to selectively capture $SO_2$ from a feed gas contain $SO_2$ and $CO_2$. Sulfuric acid mist ($pK_{a2}$=−3) is so strong that it forms heat stable salts with regenerable $SO_2$ amine absorbents.

The alkanolamine solvent used to selectively capture $SO_2$ may be any of those disclosed in U.S. Pat. No. 5,019,361, the disclosure of which is incorporated herein by reference. In particular, the solvent may be represented by the structural formula:

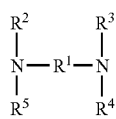

wherein $R^1$ is alkylene of two or three carbon atoms, $R^2$, $R^3$, $R^4$, and $R^5$ may be the same or different and can be hydrogen, alkyl (e.g., lower alkyl of 1 to about 8 carbon atoms including cycloalkyls), hydroxyalkyl (e.g., lower hydroxy alkyl of 2 to about 8 carbon atoms), aralkyl (e.g., 7 to about 20 carbon atoms), aryl (preferably monocyclic or bicyclic), alkaryl (e.g., 7 to about 20 carbon atoms), and any of $R^2$, $R^3$, $R^4$, and $R^5$ may form cyclic structures. Diamines are organic compounds containing two nitrogen atoms, and are often preferred due to their commercial availability and generally lower viscosity. The amines, e.g., in an embodiment the diamines are tertiary diamines, in view of their stability. However, others may be employed, provided mild oxidative or thermal conditions exist to minimize chemical reaction of the solvent. Often, the preferred amine salt absorbents have a hydroxyalkyl group as a substituent on an amine group. In some instances, the hydroxy substituent is believed to retard the oxidation of sulphite or bisulphite to sulphate.

To enable a high loading of recoverable sulfur dioxide to be absorbed in the absorbing medium under atmospheric pressure conditions, it is preferable for the free amine form of the amine absorbent to have a molecular weight less than about 300, preferably less than about 250. Often the tertiary diamines are of the formula:

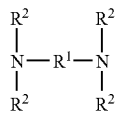

wherein $R^1$ is an alkylene group, containing from 2 to 3 carbon atoms as a straight chain or as a branched chain, and each $R^2$ is the same or different and is an alkyl group, such as methyl or ethyl, or a hydroxy-alkyl group, such as 2-hydroxyethyl. In an embodiment, the amines are N,N'N'-(trimethyl)-N-(2-hydroxyethyl)-ethylenediamine (pKa=5.7); N,N,N',N'-tetramethylethylenediamine (pKa=6.1); N,N,N',N'-tetrakis (2-hydroxyethyl) ethylenediamine (pKa=4.9); N-(2-hydroxyethyl)ethylenediamine (pKa=6.8); N,N'-dimethylpiperazine (pKa=4.8); N,N,N',N'-tetrakis (2-hydroxyethyl)-1,3-diaminopropane; and N',N'-dimethyl-N,N-bis(2-hydroxyethyl)ethylenediamine. Also included among the useful diamines are heterocyclic compounds, such as piperazine (pKa=5.8). The pKa values are for the sorbing nitrogen.

If it is desired to capture weak acid gases such as $H_2S$ and/or $CO_2$, then a stronger amine of $pK_a>7.5$, such as monoethanolamine, diethanolamine or methyldiethanolamine are used. Acids substantially stronger than $H_2S$ or carbonic acid will form heat stable salts. Examples are $SO_2$, formic acid, acetic acid, hydrochloric acid, sulfuric acid and thiocyanic acid.

The carbon dioxide solvent amines may be primary, secondary or tertiary with $pK_a$'s in the range 6.0-10, 6.5-10, or 6.5-9.5. To prevent loss of the amine with the treated gas, the amines preferably have a vapor pressure less than 1 mm Hg at 50° C. over the solvent. Amines include 4-(2-hydroxyethyl)-1-piperazineethanesulfonic acid ($pK_a$=7.5), morpholinoethanesulfonic acid ($pK_a$=6.1), N-(2-hydroxyethyl)ethylenediamine ($pK_a$ 1=9.5, $pK_a$ 2=6.5), piperazine ($pK_a$ 1=9.8, $pK_a$ 2=5.6), N-(2-hydroxyethyl)piperazine ($pK_a$ 1=9.0, $pK_a$ 2=4.5), benzimidazole ($pK_a$ 5.5), and N,N'-bis(2-hydroxyethyl)piperazine ($pK_a$ 1=7.8, $pK_a$ 2=3.9) and mixtures thereof.

If it is desired to capture both $SO_2$ and $CO_2$, then to avoid all of the $SO_2$ forming a heat stable salt in the $CO_2$ capture process, the $SO_2$ is preferably captured first with an appropriate solvent. The $CO_2$ is then removed in a second step. Since hydrogen sulfide is not thermodynamically stable in the presence of $SO_2$ or oxygen, only minor concentrations are generally found in $SO_2$ or $O_2$ containing streams.

As shown in FIG. 2, the disclosure will be exemplified in combination with an acid gas recovery unit comprising an absorption unit having a single absorption column and a regeneration unit having a single steam stripping column. Though the operation of an acid gas recovery unit 14 will be understood by those skilled in the art, the operation of the acid gas recovery unit 14 will be described.

As exemplified in FIG. 2, feed gas stream 12 is introduced to the absorption unit which comprises an apparatus to contact the feed gas with the absorbent, such as an absorption column, and may be considered to include all associated plumbing and support units, including optional prescrubber 22. As such, feed gas stream 12, which contains $SO_2$, is preferably prescrubbed to remove particulate matter from feed gas stream 12 and to quench it, at least about to its adiabatic saturation temperature. In some cases, the feed gas temperature may be reduced even lower by providing a heat exchanger to cool the circulating water. This scrubbing step may also remove other contaminants from the feed gas, e.g. hydrochloric acid and sulfuric acid. Any prescrubber system known in the art may be used. As shown in FIG. 2, feed gas stream 12 may be fed to prescrubber 22 where it is contacted counter-currently with a prescrubbing fluid stream 24, such as water, which may be sprayed into prescrubber 22 through suitable nozzles 26. In any embodiment, the prescrubbing fluid stream 24 may be recirculated. Accordingly, a recycle stream 28 may be fed to pump 30 from which return stream 32 is returned to prescrubber 22. A blowdown stream 34 going to waste may be used to control the level of dissolved and suspended solids in the recirculating water and a water makeup stream 36 may be used to replace water lost to evaporation into the feed gas and to blowdown.

After passing through the optional prescrubber 22, the pre-treated feed gas stream may then be passed through an absorption zone 38 in column 40, which may be a sulfur dioxide absorption zone. Prescrubbed gas 42 may flow from prescrubber 22 into the absorption column 40 through, e.g., a chimney tray 44, which allows the passage of gas up but prevents liquid from flowing down into prescrubber 22.

As exemplified, an acid gas lean absorbent (i.e., lean in the acid gas impurity), which is preferably a regenerated absorbent, may be introduced via stream 46 into absorption column 40 where it preferably flows counter-current to the pre-treated feed gas 42 stream so as to produce acid gas rich absorbent stream 48 and a treated or acid gas lean feed gas stream 50. As the lean acid gas absorbent stream 46 flows downward through, e.g., packing in absorption zone 38, which promotes good gas-liquid contact with the upwardly flowing gas, the acid gas lean absorbent stream selectively captures the acid gas impurity, leaving the absorption column as acid gas rich absorbent stream 48.

Acid gas lean feed gas stream 50 may then be introduced to one or more additional absorption zones (not shown), released to the atmosphere, transported to additional equipment for further treating or recycled within a process. For example, a second absorption zone may be designed to remove carbon dioxide from the feed gas stream. A third absorption zone may be designed to remove $NO_x$ and optionally some mercury from the feed gas stream. It will be appreciated that the acid gases may be selectively removed from the feed gas in any desired order. For example, the carbon dioxide absorption zone may be upstream or downstream from the sulfur dioxide and $NO_x$ absorption zones. However, since $SO_2$ tends to form heat stable salts in solvents for weaker acid gasses, it is preferable to capture $SO_2$ before other impurity gasses.

The captured pollutant is removed from the acid gas rich absorbent stream 48 by heating the stream so as to liberate the captured pollutant. This is conducted in the regeneration unit. The regeneration unit includes the heat regeneration apparatus, such as steam-stripping column 58, and all associated plumbing and support equipment. In any embodiment, a steam stripping column 58 is utilized wherein steam provides at least some, and preferably all, of the required heat to liberate the captured pollutant from the absorbent. As shown in FIG. 2, acid gas rich absorbent stream 48 and hot acid gas lean absorbent stream 54 may be passed through an indirect heat exchanger 52 to produce hot acid gas rich absorbent stream 56 that is introduced into steam-stripping column 58.

As with absorption column 40, steam stripping column 58 may be of any design known in the art and may be either a packed or tray design. In any embodiment, the hot acid gas rich absorbent stream 56 flows downward through, e.g., packing 60, in the steam stripping column 58. Hot acid gas rich absorbent stream 56 is introduced at an upper portion of steam stripping column 58 to flow downwardly through column 58. If desired, pump 72 is used to circulate stream 74 from the bottom of the steam stripping column 58 to reboiler 62. It will be appreciated that reboiler 62 may be a forced circulation reboiler, a kettle reboiler or a thermosyphon reboiler. A hot acid gas lean absorbent pump is preferably provided to push the solvent through the lean-rich exchanger into a lean amine surge tank (not shown). The steam generated by the boiling of the absorbent in reboiler 62 enters steam stripping column 58 as stream 68 to provide the energy and mass transfer promotion for stripping the acid gas from the acid gas absorbent.

The reboiler is heated by any means known in the art. In any embodiment, reboiler 62 may be indirectly heated by stream 64 (which may be steam and may be obtained from any source) through e.g., a heat transfer tube bundle, producing a steam condensate stream 66 which may be recycled to produce additional steam or used elsewhere in a plant. The boiling of the absorbent in re-boiler 62 produces a flow of steam and desorbed acid gas 68 into steam stripping column 58. The steam and desorbed acid gas ascends upwardly through the desorption zone (packing 60) of steam stripping column 58, heating the downward flow of hot acid gas rich absorbent stream 56 and carrying upwards the gaseous pollutant that is evolved from the solvent. The steam and pollutant (in this case sulfur dioxide) exits steam stripping column 58 as stream 70. In any embodiment, the steam and desorbed acid gas travel upward through a reflux rectification section 76 of the steam stripping unit 58 prior to exiting column 58 as stream 70.

Stream 70 is cooled in the overhead condenser 78, which condenses most of the steam, creating two-phase stream 80 which may be separated in reflux accumulator 82 into overhead liquid reflux stream 84 and an acid gas stream 86. The acid gas stream 86 may flow to disposal or further processing. If the acid gas comprises sulfur dioxide, then liquid reflux stream 84 will be a sulfurous acid stream. At least a portion of, and preferably only a portion of, liquid reflux stream 84 is directed to the acidic cation exchange resin 102, to regenerate the resin. Accordingly, overhead reflux stream 84 may be split into stream 88, which is used in the ion exchange process, and stream 90, which is returned to steam stripping column 58 so as to return to the acid gas absorbent.

Regenerated absorbent collects in the bottom of steam stripping column 58 and is removed from steam stripping column 58 as stream 74, a portion of which is recycled as regenerated hot acid gas lean absorbent stream 54. Hot acid gas lean absorbent stream 54 flows through the heat exchanger 52 to form cool acid gas lean diamine absorbent stream 92.

Heat stable salts tend to build up in the acid gas absorbent. Accordingly, the acid gas absorbent is subjected to an ion exchange process, comprising at least an acidic cation exchange process, to remove the heat stable salts. For example, at least a portion of the acid gas absorbent is subjected to an acidic cation exchange to remove heat stable salts therefrom and in an embodiment, only a portion thereof (e.g. a bleed stream).

Figure 3:
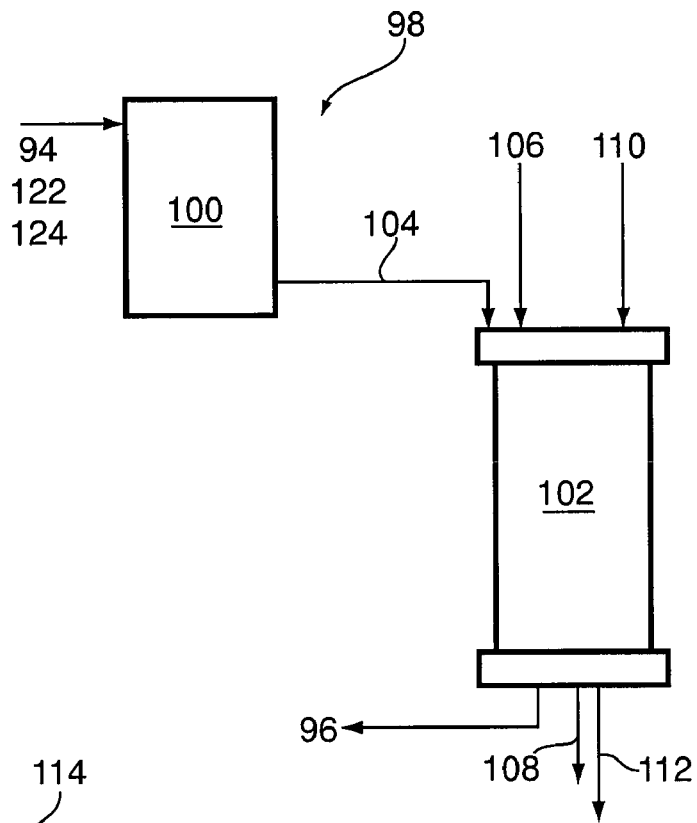
FIG. 3 is a flow diagram of an acidic cation exchange process according to an embodiment of the this disclosure.

Preferably, the absorbent that is treated to remove heat stable salts has been treated to remove the volatile acid gas therefrom. Therefore, absorbent that has been treated in, e.g., a steam stripping unit but has not yet been recycled to an absorption unit is treated to remove heat stable salts. Preferably, as exemplified, bleed stream 94 is drawn from cool acid gas lean absorbent stream 92. According to such an embodiment, as is illustrated in FIG. 3, stream 94 provides an acid gas absorbent stream rich in heat stable salts to the acidic cation exchange resin unit 98. Acidic cation exchange resin unit 98 returns cation reduced acid gas absorbent stream 96 having a lower heat stable salt content. Stream 46 completes the circuit, sending acid gas absorbent stream for acid gas scrubbing to the absorption column 40.

As is known to those familiar with the art, the details of the acid gas recovery unit process may be changed or added to without changing the general principles or their relevance to the present invention. For example, different types of equipment for effecting gas-liquid contact in the absorber and regenerator may be used to accomplish the same effect of absorption and stripping. Other flow sheets, such as those having lean and semi-lean amine streams may also be used in the application of the present invention. Other methods of using heat to convert the acid gas rich absorbent to acid gas lean may be used.

An embodiment of an acidic cation exchange resin unit 98 is exemplified in FIG. 3. As shown therein, an acidic cation exchange resin unit 98 includes an optional surge tank 100 and a single acidic cation exchange column 102, containing acidic cation exchange resin 18. As the acidic cation exchange resin in acidic cation exchange column 102 must be occasionally regenerated, it will be appreciated that on a periodic basis (i.e. from time to time as may be required) the flow of heat stable salt rich absorbent stream 104 through acidic cation exchange column 102 will be terminated permitting the acidic cation exchange resin to be regenerated. In an alternate embodiment, it will be appreciated that a plurality of acidic cation exchange columns 102 may be provided. Accordingly, heat stable salt rich acid gas absorbent stream 104 may be continuously fed through at least one acidic cation exchange column 102 to remove heat stable salts therefrom while the acidic cation exchange resin in one or more alternate columns 102 is being regenerated.

Any construction for an acidic cation exchange reactor known in the art may be utilized. Typically, the acidic cation exchange medium is a resin that is formed as beads. Accordingly, an acidic cation exchange column typically has a support to receive the ion exchange resin beads. The acidic cation exchange medium therefore may be beads of polymers that have functional groups on the polymer. A cation exchange resin generally has acidic functions as the exchange sites. Strong acidic cation exchange resins are typically characterized by strong acid functionalities, such as sulfonic acid. The strong acid functionality exchange their protons H+ for cations contained in the stream to be treated.

The preceding resin is merely illustrative of useful acidic cation exchange resins and is not intended to limit the resins that may be used in carrying out the process of the disclosure. For the purpose of the present disclosure, it is intended that any acidic cation exchange resin used for the removal of cations from acid gas absorbents may be used. These resins are readily identifiable by those skilled in the art.

Heat stable salt rich absorbent stream 104 which may be obtained from surge tank 100 (or may merely be an extension of bleed stream 94 if surge tank 100 is not provided), is permitted to flow through acidic cation exchange column 102 to produce a cation reduced acid gas absorbent stream 96. This is the resin loading step or the exhaustion of the resin step. During this step, the resin in column 102 interacts with the acid gas absorbent to remove cations from the diamine absorbent. When the ability of the acidic cation exchange resin to remove cations from the acid gas absorbent reaches a desired level, or after a pre-determined time, the flow of acid gas absorbent through column 102 is terminated. The cation reduced acid gas absorbent stream 96 may be returned to any desired location in acid gas recovery unit 14 and, in an embodiment, is introduced downstream from heat exchanger 52 and upstream from column 40 as shown in FIG. 2.

Subsequent to the exhaustion step of the resin, the acidic cation exchange resin is preferably treated to remove the residual diamine absorbent therefrom prior to commencing the regeneration step. Therefore, in accordance with this invention, the acidic cation exchange resin may be contacted with a wash water stream 106, to remove diamine absorbent from column 102. All, or a portion of, wash water stream 108, which is washed from the resin with wash water stream 106, is preferably recycled back to the acid gas recovery unit 14 as part of the absorbent that is used to absorb the acid gas and downstream from heat exchanger 52 and upstream from column 40 (similar to stream 96).

The heat stable salts in stream 104 may be maintained at a concentration of less than about 1, preferably less than about 0.7, more preferably less than about 0.5 and, most preferably, less than about 0.2 equivalent/mole diamine unit. Herein, "equivalent/mole diamine unit" is defined as the concentration (in mol·L−1) of anions (for example $SO_4^{2-}$) times their respective charge (in the case of sulfate $SO_4^{2-}$, the charge is −2) over the concentration of diamine (in mol·L−1).

Maintaining the concentration of the heat stable salts in stream 104 at less than about 1 equivalent/mole of diamine unit permits a higher rate of cation removal from stream 104 while reducing loss of the absorbent during regeneration of the cation exchange resin. During the acidic cation exchange process, positively charged amine molecules, especially doubly charged amine molecules, will also be absorbed by the resin in competition with cations from the heat stable salts (e.g., sodium and/or potassium) that are dissolved in the absorbent. When the concentration of the heat stable salts in the diamine absorbent stream is less than about 1 equivalent/mole of diamine unit, the diamine molecules possess fewer positive charges. Heat stable salts comprise pairs of anions (for example sulfate $SO_4^{2-}$) and amine ($RR'NH^+$). By lowering the anion contents, the protonation level of the amine is lowered. As a result, the cation exchange resin will tend to become loaded with more cations from the heat stable salts and fewer absorbent molecules. Accordingly the ratio of heat stable salt cations to absorbent molecules that are retained by the cation exchange resin is enhanced.

Subsequent to the exhaustion of the resin, the acidic cation exchange resin 18 is regenerated with a sulfurous acid reflux obtained from the acid gas recovery unit 14, and in particular, the acid gas reflux stream 88 from the steam stripping column 58. In any embodiment, the sulfurous acid reflux may have a concentration of sulfurous acid of from about 1% to about 5% wt, preferably about 3 wt %. When the heat stable salt rich acid gas absorbent stream 104 is contacted with the acidic cation exchange resin in column 102, the resin will absorb positively charged molecules, therefore absorbing both diamine absorbent molecules, as well as alkali metal cations, such as sodium and potassium. Accordingly, the sulfurous acid converts the acidic cation exchange resin back to its acidic form.

It has been determined that when a sulfurous acid reflux is used to regenerate the resin 18, the sulfurous acid preferentially elutes the diamine absorbent from the resin 18 producing a spent regeneration stream have a first portion 110 and a second portion 112. First portion 110 will be relatively rich in acid gas absorbent and may be recycled back to the acid gas recovery unit 14 for use in part of an acid gas absorbent stream without overly diluting the absorbent used therein. This prevents the loss of some of the absorbent without overly diluting the absorbent that is recycled in the acid gas recovery unit. Preferably, the first portion has a concentration of amine greater than about 1,000, more preferably greater than about 5,000, and most preferably greater than about 15,000 ppm. In an embodiment, preferably about 3 to about 5, and more preferably about 2 to about 4 bed volumes (BV) of regenerant are used and, preferably the first portion of the spent regenerant stream that is recycled to the acid gas capture unit comprises up to the first bed volume, and more preferably up to the first 0.5 bed volumes (BV) of spent regenerant.

For example, first portion 110 of the spent regeneration stream may have a diamine concentration of 1000 ppm to 30000 ppm and second portion 112 of the spent regeneration stream may have a concentration of alkali metal salts of 250 ppm to 7000 ppm and the second portion may be directed to waste treatment. The second portion 112 is optionally fed to the prescrubber 22. In another embodiment, the acidic cation exchange resin is optionally treated again with the sulfurous acid reflux to rinse the resin.

Figure 6:
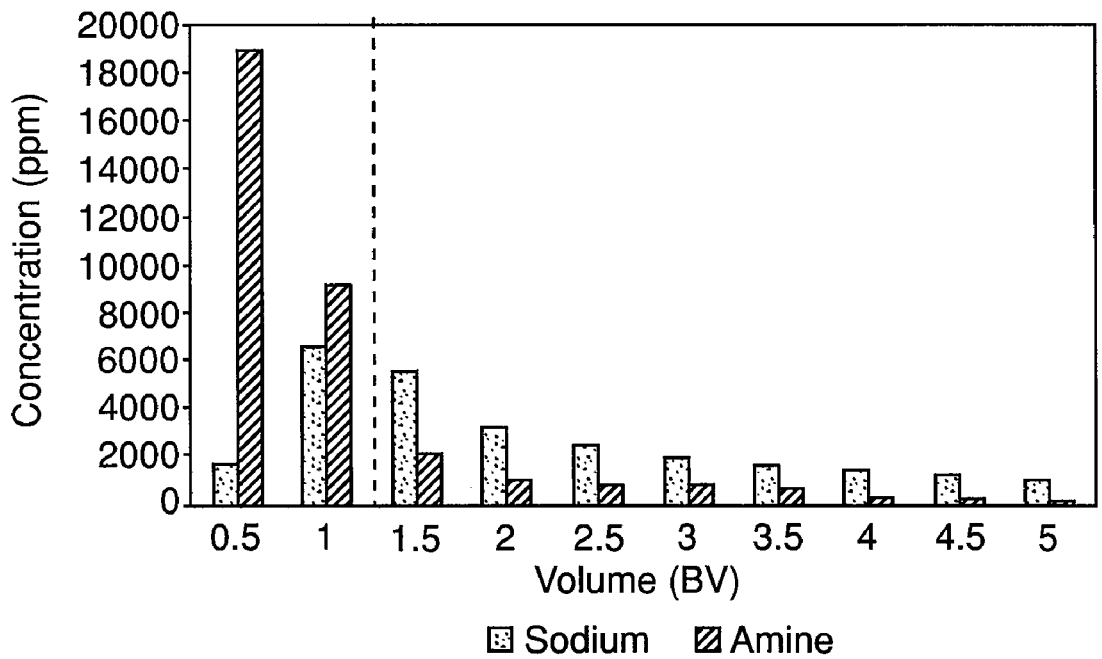
FIG. 6 is a is graph showing the amount of sodium and amine eluting during the regeneration of an acidic cation exchange resin using sulfurous acid, according to an embodiment of this disclosure.

As exemplified in the graph in FIG. 6, the use of a sulfurous acid reflux to regenerate an acidic cation exchange resin results in the first portion of the effluent stream (the spent regeneration stream) having a higher diamine concentration, and lower alkali metal concentration, than when sulfuric acid is used as the regenerant. Sulfurous acid, being a weaker mineral acid than sulfuric acid, is more selective at eluting diamines from the exchange resin, which results in the higher diamine concentration. Without being bound by theory, it is thought that sulfuric acid, being a stronger acid than sulfurous acid, displaces equally amine and sodium from the resin. Sulfurous acid, being a weaker acid, displaces in a first step the weaker cations (i.e. the amine) and not the stronger cations (sodium). Furthermore, when sulfuric acid is used as the regenerant, the sulfate ($SO_4^{2-}$) ions can form heat stable salts with alkali metals, which then must also be removed from the acid gas absorbent, as opposed to sulfurous acid from the reflux, which does not contain sulfate ions.

In an embodiment, before bleed stream 94 is directed to an acidic cation exchange resin unit 98, stream 94 is directed to a basic anion exchange resin unit 114 to remove anions, such as sulfates, thiosulfates, sulfites, chlorides, nitrates and organic acids. These anions are preferably removed to prevent amine protonation and then loss of amine during the cation removal step.

Figure 4:
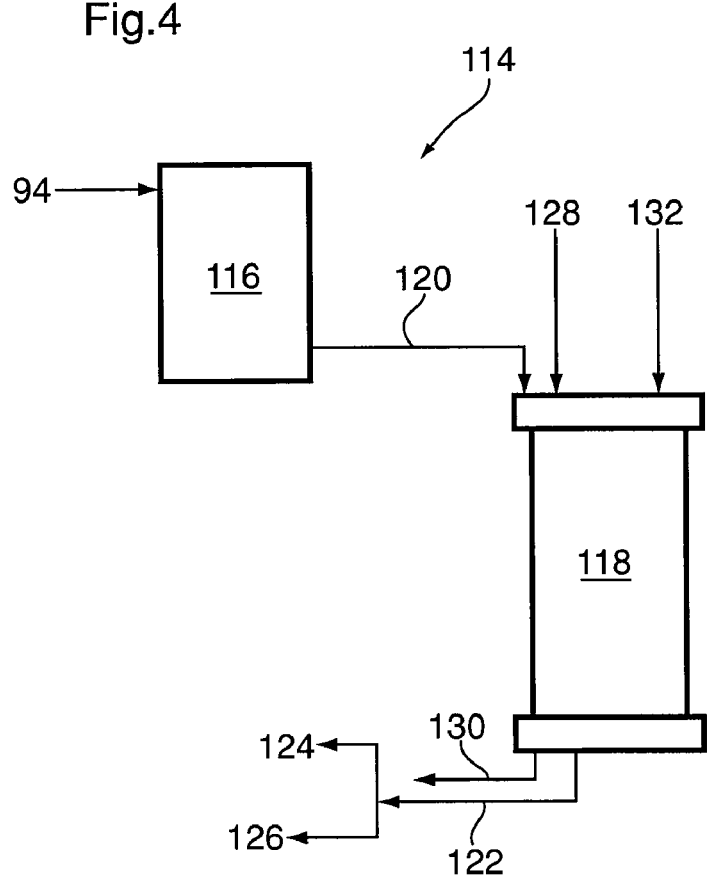
FIG. 4 is a flow diagram of a basic anionic exchange process showing a stream connecting it to an acidic cation exchange process.

As exemplified in FIG. 4, a basic anion exchange unit 114 includes an optional surge tank 116 and a single basic anion exchange column 118, containing basic anionic exchange resin. As the basic anion exchange resin in basic anion exchange column 118 must be occasionally regenerated, it will be appreciated that on a periodic basis (i.e. from time to time as may be required) the flow of heat stable salt rich diamine absorbent stream 120 through basic anionic exchange column 118 will be terminated permitting the basic anionic exchange resin to be regenerated. In an alternate embodiment, it will be appreciated that a plurality of basic anionic exchange columns 118 may be provided. Accordingly, heat stable salt rich diamine absorbent stream 120 may be continuously fed through at least one basic anionic exchange column 118 to remove anions therefrom while the basic anionic exchange resin in one or more alternate columns 118 is being regenerated.

Stream 120 is fed through the basic anionic exchange column 118 to produce an anion lean diamine absorbent stream 122 and at least a portion of, and preferably only a portion of, stream 122 is directed to the acidic cation exchange resin unit 98 for removal of cations. In a preferred embodiment, the anion lean diamine absorbent stream 122 comprises a first portion 124 and a second portion 126, wherein the first portion 124 is directed towards the acidic cation exchange resin unit 98, while the second portion 126 is directed to acid gas unit 14, so as to be used to regenerably absorb additional acid gas. In an embodiment, the first portion 124 preferably comprises a concentration of heat stable salts comprising from about 10% to about 50%, preferably about 20% to about 30% of anion lean diamine absorbent stream 122. The first portion may be selected to have a desired concentration of heat stable salt.

Similar to the acidic cation exchange resin, the anionic basic exchange resin will also need to be regenerated due to exhaustion of the resin. Subsequent to the exhaustion step of the resin, the anionic basic exchange resin is preferably treated to remove the residual diamine absorbent therefrom prior to commencing the regeneration step. Therefore, in accordance with this disclosure, the anionic basic exchange resin may be contacted with a wash water stream 128, to remove diamine absorbent from column 118. All or a portion of residual diamine rich absorbent stream 130, which is washed from the resin with water stream 128, may be recycled back to the acid gas recovery unit 14 and preferably to absorption column 40. Stream 130 may be returned to the continuous amine loop in acid gas recovery unit 14 downstream from heat exchanger 52 and upstream from column 40 (similar to stream 96).

Subsequently, the anionic basic exchange resin is regenerated using a regeneration agent. For example, the regeneration agent may be a basic solution, which is supplied via stream 132. The regeneration agent may be supplied via stream 132. The regeneration agent may be diluted caustic. The regeneration agent converts the anionic basic exchange resin back to its starting form. Accordingly, the base converts the anionic basic exchange resin back to its basic form Any construction for a basic anion exchange reactor known in the art may be utilized. Typically, the basic anion exchange medium is a resin that is formed as beads. Accordingly, a basic anion exchange column typically has a support to receive the ion exchange resin beads. The basic anion exchange medium therefore may be beads of polymers that have functional groups on the polymer. A basic anion exchange resin generally has basic functions as the exchange sites, such as quaternary ammonium salts. Weak base anion exchange resins are typically characterized by functionalities with lower pKa, such as tertiary amines. The basic functionalities of the resin exchange their anions with anions contained in the stream to be treated.

The removal of heat stable salts from both strong and weak amine solvents can be performed by essentially the same process, with only optional adjustment for the type of resin and type and quantity of regeneration agent and rinse volumes being necessary to optimize for each particular amine solvent and type of heat stable salts.

It will be appreciated that various modifications and variations may be made and all of those modifications and variations are within the scope of the following claims. For example, any $SO_2$, $CO_2$ and $H_2S$ absorbent known in the art may be used. The absorbents may be regenerated and recycled and, if so, they may be regenerated and recycled by any means known in the art. The ion exchange unit may use surge tanks and storage tanks to accumulate the various streams which are used in the ion exchange unit or which are produced by the ion exchange unit. Any ion exchange resin or series of resins known in the art may be used. It will also be appreciated that the steps may be combined in various combinations and subcombinations.

EXAMPLES

The operation of the invention is illustrated by the following representative examples. As is apparent to those skilled in the art, many of the details of the examples may be changed while still practicing the disclosure described herein.

Example 1

Comparative Example of Sodium Removal from a Diamine Regenerable $SO_2$ Absorbent Using Sulfuric Acid This example exemplifies the regeneration of a cation exchange resin using sulfuric acid. The absorbent that was provided to the test bed was a diamine absorbent contaminated with sodium. The composition is given in Table 1.

TABLE 1

| Composition of Sodium Contaminated Diamine Absorbent | |
|---|---|
| Amine concentration (wt %) | 24.2 |
| Sodium concentration (wt %) | 2 |
| Sulfate concentration (wt %) | 12 |
| HSAS: (eq. $SO_4^{2-}$/mol amine) | 1.1 |

The testing was performed with Lewatitt K-2629 strong acid ion exchange resin in a 3 cm diameter insulated column. The resin bed had a height of 35 cm and a bed volume (BV) of 200 ml. All fluids introduced to the column were at 50° C. The resin was conditioned by several cycles of loading and regeneration prior to making the experiments.

The sodium removal experiment was done using the procedure as follows:
1. Amines and sodium were loaded on the resin by passing 1.5 BV of the contaminated diamine absorbent through the column. Na+ ions and amine were loaded on resin and H+ ions were displaced into the amine solution exiting the column.

2. The resin was washed with 1.5 BV of water to displace the amine solvent from the resin prior to regenerating the resin.
3. The resin was regenerated back to the base form by passing 2.5 BV of 4% wt. sulfuric acid through the column. During this step, H+ ions are loaded on resin and Na+ ions and remaining amine are displaced into regeneration phase.
4. The resin bed was then subjected to a final wash with 1.5 BV of water to rinse remaining regenerant from the resin bed.
5. The next loading step was conducted.

Figure 5:
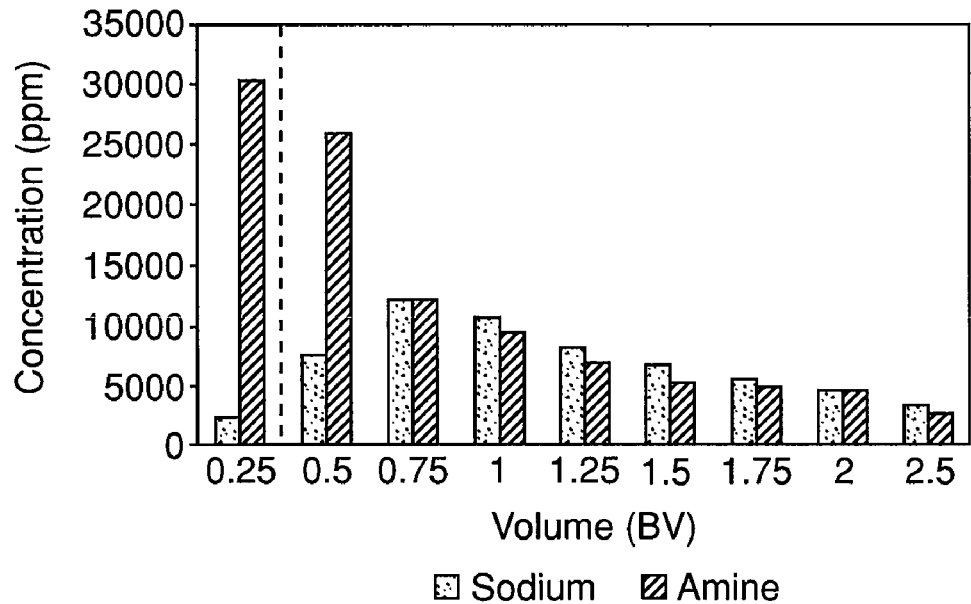
FIG. 5 is a graph showing the amount of sodium and amine eluting during the regeneration of an acidic cation exchange resin using $H_2SO_4$, according to an embodiment of this disclosure.

Samples of the column effluent during the regeneration phase were taken every 0.25 BV and analyzed for sodium and amine content. The results are shown in the FIG. 5. As can be seen in FIG. 5, by the time that 0.75 BV of regenerant are fed through the resin bed, the concentration of sodium in the spent regenerant is the same as the concentration of amine absorbent.

In this example, the first portion of the spent regenerant (the first 0.5 BV) has a relatively high concentration of amine to sodium. Accordingly, the first portion of the wash water may be returned to an acid gas recovery unit without returning much sodium to the amine absorbent used in the acid gas recovery unit.

Table 2 shows the amine loss and sodium removal as a function of the volume of spent regenerant sent back to the scrubbing process. The optimum is to return 0.25 BV to the acid gas recovery unit, giving a ratio of 1.13 g of amine lost per gram of sodium removed. However, returning the first 0.5 BV to the acid gas recovery unit also produces acceptable results.

TABLE 2

Amine Loss and Sodium Removal as a Function of Volume of Regenerant Returned

| Regenerant Returned (BV) | Na removal (g/L resin) | Amine loss (g/L resin) | Amine lost/ Na removed |
|---|---|---|---|
| 0 | 15.9 | 29.3 | 1.85 |
| 0.25 | 13.5 | 15.3 | 1.13 |
| 0.5 | 10.5 | 12.3 | 1.17 |

Example 2

Regeneration of an Acidic Cation Exchange Resin Using Sulfurous Acid Reflux

This example exemplifies the regeneration of an acidic cation exchange resin using sulfurous acid as a replacement for sulfuric acid. The sulfurous acid is produced as stripper overhead reflux in a regenerable $SO_2$ scrubbing process. The $SO_2$ concentration in the reflux was 3.1% wt. The resin used and other test conditions were the same as in Example 1. The flow sequence and bed volumes for the test are given in Table 3.

TABLE 3

Flow sequence and bed volumes for regeneration of acidic cation exchange resin using sulfurous acid reflux

| Phase | Volume sent (BV) | Flow rate (BV/hr) |
|---|---|---|
| Amine Loading | 2 | 15 |
| Amine Wash | 2.5 | |
| Acid Regeneration | 5 | |
| Final rinse | 3 | |

The spent regeneration was again analyzed for sodium and amine and the results are shown in FIG. 6. As can be seen in FIG. 6, a considerable amount of amine elutes in the first 0.5 BV, and has a very high amine concentration (about 19,000 ppm) compared to the sodium concentration. In this example, at least the first 0.5 BV and optionally the first 1 BV, can be redirected to the acid gas recovery unit.

Table 4 shows the comparison of a 3.1% (by weight) solution of sulfurous acid for the regeneration of an acidic cation exchange resin vs. a 4% wt. sulfuric acid solution:

TABLE 4

Sulfuric acid vs. sulfurous acid reflux in the regeneration of an acidic cation exchange resin

| Regenerant | Regenerant returned to system (BV) | Na removal (g/L resin) | Amine Removal (g/L resin) | Amine lost/ Na removed |
|---|---|---|---|---|
| $H_2SO_4$ 4% wt | 0.25 | 13.5 | 15.3 | 1.13 |
| Reflux 3.1% wt | 1 | 9.0 | 2.0 | 0.22 |

As seen in Table 4, the sulfurous acid reflux is more effective than the sulfuric acid in terms of amine lost per weight of sodium removed. Further, 1 BV may be directed to the acid gas recovery unit when the regenerant is sulfurous acid reflux with returning an excess of sodium to the acid gas absorption unit.

Example 3

Regeneration of an Acidic Cation Exchange Resin Using Sulfurous Acid Reflux

This example exemplifies the regeneration of an acidic cation exchange resin using a 3.1% wt. sulfurous acid reflux and compares it to the regeneration of a resin using a 1% wt. sulfuric acid solution.

Figure 7:
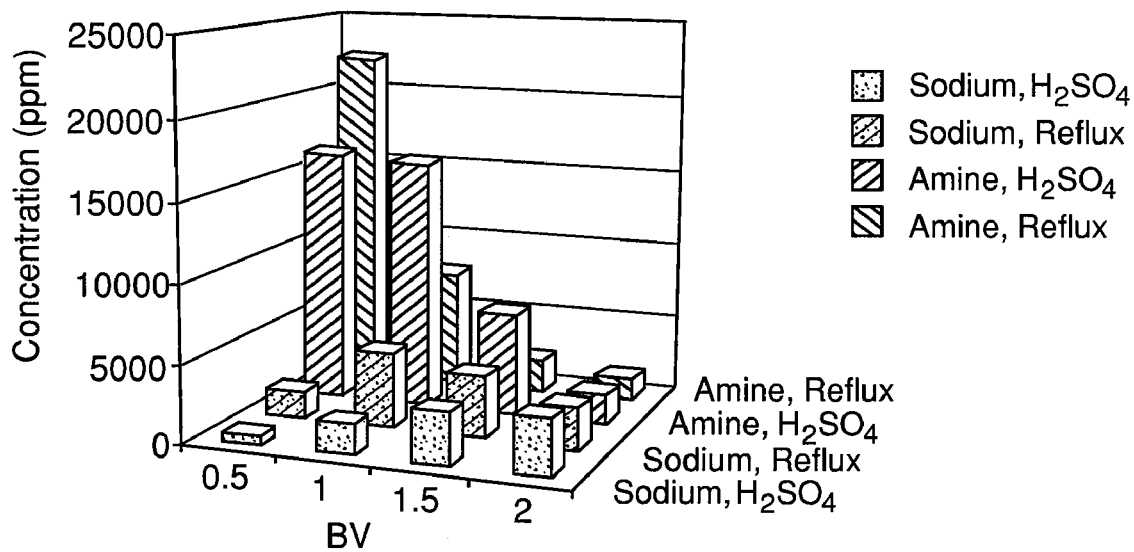
FIG. 7 is a graph showing a comparison between the amounts of amine and sodium eluted from an acidic cation exchange resin using a 3.1% sulfurous acid reflux and a 1% $H_2SO_4$ solution, according to an embodiment of this disclosure.

The sulfurous acid regenerant elutes amine from the column preferentially over sodium, providing increased or equivalent amine recovery less contaminated by sodium compared to sulfuric acid regeneration, as is shown in the graph below in FIG. 7. As can be seen from the graph in FIG. 7, the amine concentration in the first 0.5 BV for the sulfurous acid reflux is substantially higher than that for the sulfuric acid solution (22,305 ppm vs. 16,439 ppm). Furthermore, at 1 BV, the amount of amine recovered when using sulfurous acid reflux is approximately equal to the amount of amine recovered at 1.5 BV when using sulfuric acid. This shows that the reflux has a higher initial selectivity thereby producing a sharper peak on the elution of amine, which therefore results in less dilution of the diamine absorbent.

As a result of sulfuric acid containing sulfate ($SO_4^{2-}$), which forms heat stable amine salts, recycling the diamine absorbent to the acid gas recovery unit when the regenerant is sulfuric acid results in the addition of HSS to the recovery unit. As is detailed in Table 5, while the sodium removal and amine loss/sodium removed are about equivalent for sulfurous acid reflux and sulfuric acid (at 1 and 1.5 BV, respectively), reflux regeneration has the major advantage of not containing heat stable amine salts in the amine that is returned to the acid gas absorption unit.

TABLE 5

Comparison of 3.1% reflux versus 1% sulfuric acid

| Regenerant | Volume Kept (BV) | Amine Lost (g/L) | Na Removed (g/L) | Amine lost/ Na removed | Sulfate Addition (g/L) |
|---|---|---|---|---|---|
| Reflux 3.1% | 1 | 4.3 | 6.8 | 0.63 | 0 |
| $H_2SO_4$ 1% wt | 1.5 | 4.0 | 6.5 | 0.61 | 10.9 |

As seen in Table 5, using sulfurous acid reflux does not result in the addition of sulfates to the spent regenerant, while sulfuric acid results in a large addition of sulfates. Accordingly, when sulfuric acid is used as the regenerant, the addition of heat stable salts results in the acid gas absorbent having to be subjected to the acidic cation exchange resin more often, which leads to an increased loss of diamine absorbent.

Table 6, sets out the preferred conditions for sodium removal using reflux compared with the use of sulfuric acid.

TABLE 6

Preferred conditions for sodium removal from Cansolv DS ™ solvent

| | Volume passed (BV) | | | |
|---|---|---|---|---|
| Phase | Reflux 4.8% (at 3% Na) | Reflux 4.8% (at 2% Na) | Reflux 4.8% (at 1% Na) | $H_2SO_4$ 1% (at 1% Na) |
| Sodium loading | 2 | 2 | 2 | 2 |
| Amine washing | 2 | 2 | 2 | 2 |
| Regeneration | 4 | 4 | 4 | 4 |
| Rinse | 0 | 0 | 0 | 1.5 |

*Note that temperature is 50° C. for all fluids and flow rate is set at 15 BV/hr for all phases. HSAS was 1.1 eq. $SO_4^{2-}$/mol amine. The loading volume has been set at 2 BV regardless of the sodium concentration to set a uniform condition that fully utilizes the resin capacity.

We claim:

1. A process for the regeneration of an acidic cation exchange resin used to treat an acid gas absorbent stream comprising at least one alkali metal salt, the process comprising:
    (a) obtaining the acid gas absorbent stream from an acid gas recovery unit;
    (b) contacting the acid gas absorbent stream with an acidic cation exchange resin and generating a cation reduced acid gas absorbent stream; and,
    (c) regenerating the acidic cation exchange resin using a sulfurous acid reflux obtained from the acid gas recovery unit and producing a spent regeneration stream
    wherein step (c) comprises a single chemical treatment step.

2. The process according to claim 1, wherein the sulfurous acid reflux is obtained from a steam stripping unit of the acid gas recovery unit.

3. The process according to claim 1, wherein a feed gas to the acid gas recovery unit includes SO2 and the sulfurous acid is generated from the SO2 captured by an acid gas absorbent stream from the feed gas in the acid gas recovery unit.

4. The process according to claim 1, wherein the sulfurous acid reflux has a concentration of sulfurous acid of from about 1 to about 5 wt %.

5. The process according to claim 1, wherein the alkali metal salt is an alkali metal salt of at least one strong acid.

6. The process according to claim 5, wherein the strong acid comprises at least one of sulfuric acid, nitric acid or hydrochloric acid.

7. The process according to claim 1, wherein the alkali metal comprises sodium or potassium.

8. The process according to claim 1, wherein the acidic cation exchange resin is a strong acid resin.

9. The process according to claim 1, further recycling the cation reduced acid gas absorbent stream to the acid gas recovery unit.

10. The process according to claim 1, wherein the acid gas recovery unit includes an absorption unit including an absorber and an absorbent regeneration unit that includes a steam stripping column and the process further comprises obtaining the acid gas absorbent stream from downstream of the steam stripping column and upstream of the absorber.

11. The process according to claim 1, wherein the spent regeneration stream comprises a first portion and a second portion and the process further comprises recycling only the first portion of the spent regeneration stream to the acid gas recovery unit for use as part of an acid gas absorption solution.

12. A process for the regeneration of an acidic cation exchange resin used to treat an acid gas absorbent stream comprising at least one alkali metal salt, the process comprising:
    (a) obtaining the acid gas absorbent stream from an acid gas recovery unit;
    (b) contacting the acid gas absorbent stream with an acidic cation exchange resin and generating a cation reduced acid gas absorbent stream; and,
    (c) regenerating the acidic cation exchange resin using a sulfurous acid reflux obtained from the acid gas recovery unit and producing a spent regeneration stream
    wherein the spent regeneration stream comprises a first portion and a second portion and the process further comprises recycling only the first portion of the spent regeneration stream to the acid gas recovery unit for use as part of an acid gas absorption solution and wherein the acid gas absorbent stream comprises a diamine absorbent and the first portion of the spent regeneration stream has a diamine concentration of about 1000 ppm to about 30000 ppm.

13. A process for the regeneration of an acidic cation exchange resin used to treat an acid gas absorbent stream comprising at least one alkali metal salt, the process comprising:
    (a) obtaining the acid gas absorbent stream from an acid gas recovery unit;
    (b) contacting the acid gas absorbent stream with an acidic cation exchange resin and generating a cation reduced acid gas absorbent stream; and,
    (c) regenerating the acidic cation exchange resin using a sulfurous acid reflux obtained from the acid gas recovery unit and producing a spent regeneration stream
    wherein the spent regeneration stream comprises a first portion and a second portion and the process further comprises recycling only the first portion of the spent regeneration stream to the acid gas recovery unit for use as part of an acid gas absorption solution and wherein the second portion of the spent regeneration stream comprises alkali metal salts having a concentration of about 250 ppm to about 7000 ppm and the second portion is directed to waste treatment.

14. The process according to claim 1, further comprising rinsing the acidic cation exchange resin with water and generating an absorbent rich rinse stream prior to contacting the acidic cation exchange resin with the acid gas absorbent stream.

15. The process according to claim 14, wherein the absorbent rich rinse stream is recycled back to the acid gas recovery unit for use as part of an acid gas absorption stream.

16. A process for the regeneration of an acidic cation exchange resin used to treat an acid gas absorbent stream comprising at least one alkali metal salt, the process comprising:
 (a) obtaining the acid gas absorbent stream from an acid gas recovery unit;
 (b) contacting the acid gas absorbent stream with an acidic cation exchange resin and generating a cation reduced acid gas absorbent stream; and,
 (c) regenerating the acidic cation exchange resin using a sulfurous acid reflux obtained from the acid gas recovery unit and producing a spent regeneration stream wherein a sufficient amount of sulfurous acid reflux is utilized to regenerate the acidic cation exchange resin that the acidic cation exchange resin is ready for use to treat an additional amount of the acid gas absorbent stream in the absence of a final water rinse.

17. The process according to claim 1, further comprising utilizing the acidic cation exchange resin to treat an additional amount of the acid gas absorbent stream as the next process step subsequent to step (c) of claim 1.

18. A process for the regeneration of an acidic cation exchange resin used to treat an acid gas absorbent stream comprising at least one alkali metal salt, the process comprising:
 (a) obtaining the acid gas absorbent stream from an acid gas recovery unit;
 (b) contacting the acid gas absorbent stream with an acidic cation exchange resin and generating a cation reduced acid gas absorbent stream; and,
 (c) regenerating the acidic cation exchange resin using a sulfurous acid reflux obtained from the acid gas recovery unit and producing a spent regeneration stream wherein the acid gas absorbent stream comprises a diamine absorbent having a concentration of heat stable salts that is less than 1 equivalent/mole of diamine.

19. The process according to claim 18, wherein the concentration is less than about 0.7 equivalent/mole of diamine.

20. The process according to claim 1, further comprising contacting the acid gas absorbent stream with a basic anion exchange resin in the hydroxide form and generating an anion lean acid gas absorbent stream and using at least a portion of the anion lean acid gas absorbent stream in step (b) of claim 1.

21. A process for the regeneration of an acidic cation exchange resin used to treat an acid gas absorbent stream comprising at least one alkali metal salt, the process comprising:
 (a) obtaining the acid gas absorbent stream from an acid gas recovery unit;
 (b) contacting the acid gas absorbent stream with an acidic cation exchange resin and generating a cation reduced acid gas absorbent stream;
 (c) regenerating the acidic cation exchange resin using a sulfurous acid reflux obtained from the acid gas recovery unit and producing a spent regeneration stream; and,
 (d) contacting the acid gas absorbent stream with a basic anion exchange resin in the hydroxide form and generating an anion lean acid gas absorbent stream and using at least a portion of the anion lean acid gas absorbent stream in step (b) wherein the portion of the anion lean acid gas absorbent stream used in step (b) has a concentration of heat stable salts that is less than 1 equivalent/mole of diamine.

\* \* \* \* \*